(12) United States Patent
Ranger (10) Patent No.: US 7,798,308 B2
(45) Date of Patent: Sep. 21, 2010

(54) PACKAGE ALIGNMENT SYSTEM FOR A CONVEYER

(75) Inventor: Michel Ranger, Lachine (CA)

(73) Assignee: Sidel (Canada) Inc., Laval, Quebec (CA)

( * ) Notice: Subject to any disclaimer, the term of this patent is extended or adjusted under 35 U.S.C. 154(b) by 782 days.

(21) Appl. No.: 10/591,613

(22) PCT Filed: Mar. 4, 2005

(86) PCT No.: PCT/CA2005/000341

§ 371 (c)(1),
(2), (4) Date: May 31, 2007

(87) PCT Pub. No.: WO2005/085103

PCT Pub. Date: Sep. 15, 2005

(65) Prior Publication Data

US 2007/0289840 A1    Dec. 20, 2007

Related U.S. Application Data

(60) Provisional application No. 60/549,922, filed on Mar. 5, 2004.

(51) Int. Cl.
*B65G 47/244* (2006.01)

(52) U.S. Cl. .......... 198/415; 198/377.05; 198/395; 198/412; 198/623

(58) Field of Classification Search .......... 198/376, 198/377.05, 381, 390, 394, 395, 412, 415, 198/416, 623, 626.1, 626.3, 626.4, 689.1
See application file for complete search history.

(56) References Cited

U.S. PATENT DOCUMENTS

| | | | | |
|---|---|---|---|---|
| 3,580,380 A | * | 5/1971 | Phillips | |
| 3,847,044 A | * | 11/1974 | Rudszinat | |
| 3,928,115 A | * | 12/1975 | Kerwin | 156/363 |
| 3,938,653 A | * | 2/1976 | Senger | 198/379 |
| 3,958,688 A | * | 5/1976 | Sterling | 198/416 |
| 4,464,884 A | * | 8/1984 | Franks | 53/557 |
| 5,074,399 A | * | 12/1991 | Kettle et al. | 198/395 |
| 5,215,180 A | * | 6/1993 | Allard et al. | 198/395 |
| 5,373,933 A | * | 12/1994 | Planke et al. | |
| 5,701,990 A | * | 12/1997 | Novak et al. | 198/604 |
| 5,762,174 A | * | 6/1998 | Risley et al. | 198/456 |
| 5,810,955 A | * | 9/1998 | Seifert et al. | 156/64 |

(Continued)

OTHER PUBLICATIONS

Written Opinion of the International Search Authority for PCT/CA2005/000341 dated May 30, 2005.
International Search Report for PCT/CA2005/000341 dated Jun. 29, 2005.*

*Primary Examiner*—Douglas A Hess
(74) *Attorney, Agent, or Firm*—Nixon & Vanderhye PC (57) ABSTRACT

An assembly for rotating a selected article in a stream of like articles without rotating an adjacent article, each of the articles moving along a conveying surface of a conveyor belt with a speed of forward travel and comprising an axis which is normal to the conveying surface. The assembly comprises a mechanism for revolving the selected article around the axis without changing between the axis of the revolving selected article and the axis of the non-revolving adjacent article.

22 Claims, 5 Drawing Sheets

U.S. PATENT DOCUMENTS

| | | | |
|---|---|---|---|
| 5,919,028 A * | 7/1999 | Edqvist | 414/754 |
| 6,012,344 A * | 1/2000 | Halbo | |
| 6,253,438 B1 * | 7/2001 | Jespersen | 29/426.4 |
| 6,466,789 B1 * | 10/2002 | Bruhn et al. | 455/436 |
| 6,846,256 B2 * | 1/2005 | Pang | 474/136 |
| 7,097,029 B2 * | 8/2006 | Halang | 198/779 |
| 7,574,845 B2 * | 8/2009 | Varhaniovsky | 53/426 |

* cited by examiner

FIG_5

PACKAGE ALIGNMENT SYSTEM FOR A CONVEYER

This application is the US national phase of international application PCT/CA2005/000341 filed 4 Mar. 2005, which designated the U.S. and claims benefit of Provisional Application No. 60/549,922, filed 5 Mar. 2004, the entire contents of each of which are hereby incorporated by reference.

The present application claims the benefit of a commonly assigned provisional application entitled "Package Alignment System for a Conveyor", which was filed on Mar. 5, 2004 and assigned the Ser. No. 60/549,922. The entire contents of the foregoing provisional patent application are hereby incorporated by reference.

FIELD OF THE INVENTION

The present invention relates to package alignment systems for a conveyer. More specifically, this invention relates to an article alignment assembly for selectively rotating articles in a conveyer system.

BACKGROUND OF THE INVENTION

Conveyer systems for the automatic handling, manipulation and moving of packages and objects are commonplace in various settings. Of particular interest are conveyers comprising package alignment systems for controlling the alignment and orientation of objects carried thereon. Such systems are already known in the art but are generally substantially inflexible allowing only limited manoeuvrability of the conveyed objects.

For instance, prior art systems include conveyer carrousels comprised of independently rotating platforms, to which are fed objects from a main conveyer system for rotation. The objects in question are brought to the carrousel by a segment of the main conveyer, positioned on respective rotating platforms, and selectively flipped 180 degrees, to finally be recaptured by the main conveyer. These systems are generally expensive and voluminous requiring considerable modifications for each new product or object to be used therewith. Variable selective rotation is also not available with these systems.

Another prior art system for rotating and aligning objects on a conveyer utilises two lateral belts driven at speeds respectively slower and faster than the main conveyer. Consequently, objects passing between the two lateral belts will indiscriminately be rotated due to the speed differential thereof. Every object is rotated equally which means that objects entering this segment must be identically oriented if they are to exit having a substantially identical orientation.

Finally, other such systems consist of pressing objects to be rotated against a single moving lateral belt using a fixed lateral press. In this system, only one object may be processed at a time, forcing the objects on the main conveyer to be accelerated prior to entry into the rotation station to allow for adequate separation between the individual objects. High conveyer outputs combined with accelerated single-pass full rotations result in fast rotation speeds and often reduced or even insufficient rotation control.

The present invention, described herein and with reference to the appended illustrative drawings, provides a package alignment system for a conveyer that overcomes the above and other drawbacks of prior art systems.

SUMMARY OF THE INVENTION

In order to address the above and other drawbacks there is provided an assembly for rotating a selected article in a stream of like articles without rotating an adjacent article, each of the articles moving along a conveying surface of a conveyor belt with a speed of forward travel and comprising an axis which is normal to the conveying surface. The assembly comprises a mechanism for revolving the selected article around the axis without changing the speed of forward travel of the axis. A distance travelled by the axis of the revolving selected article is greater than a distance between the axis of the revolving selected article and the axis of the non-revolving adjacent article.

Furthermore, there is disclosed an assembly for selectively rotating an article around an article axis, the article moving along a conveying surface of a conveyor belt with a speed of forward travel and comprising a substantially cylindrical portion coaxial with the article axis. The assembly comprises first and second moving surfaces, the surfaces positioned opposite one another at a level of the article cylindrical portion, the surfaces running parallel to and travelling in the same direction as the conveying surface, each of the surfaces travelling at a speed different than the speed of forward travel such that the average of said first and second moving surface speeds is the speed of forward travel and a mechanism for increasing friction between the moving surfaces and the selected article cylindrical portion.

There is also disclosed an assembly for selectively applying pressure to a selected article in a stream of like articles, each of the articles moving along a conveying surface of a conveyor belt with a speed of forward travel and comprising an axis which is normal to the conveying surface. The assembly comprises a moving surface positioned opposite the conveying surface and moving at a speed of the conveying surface, the articles travelling in an opening between said moving surface and the conveying surface, a sensor for determining the position of the selected article along the conveying surface and an actuating assembly for reducing the opening at a point opposite the selected article such that the opening is less than a height of the selected article.

Other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

Having thus generally described the nature of the invention, reference will now be made to the accompanying drawings, showing by way of illustration, illustrative embodiments thereof, and in which.

DETAILED DESCRIPTION OF THE ILLUSTRATIVE EMBODIMENTS

Figure 1:
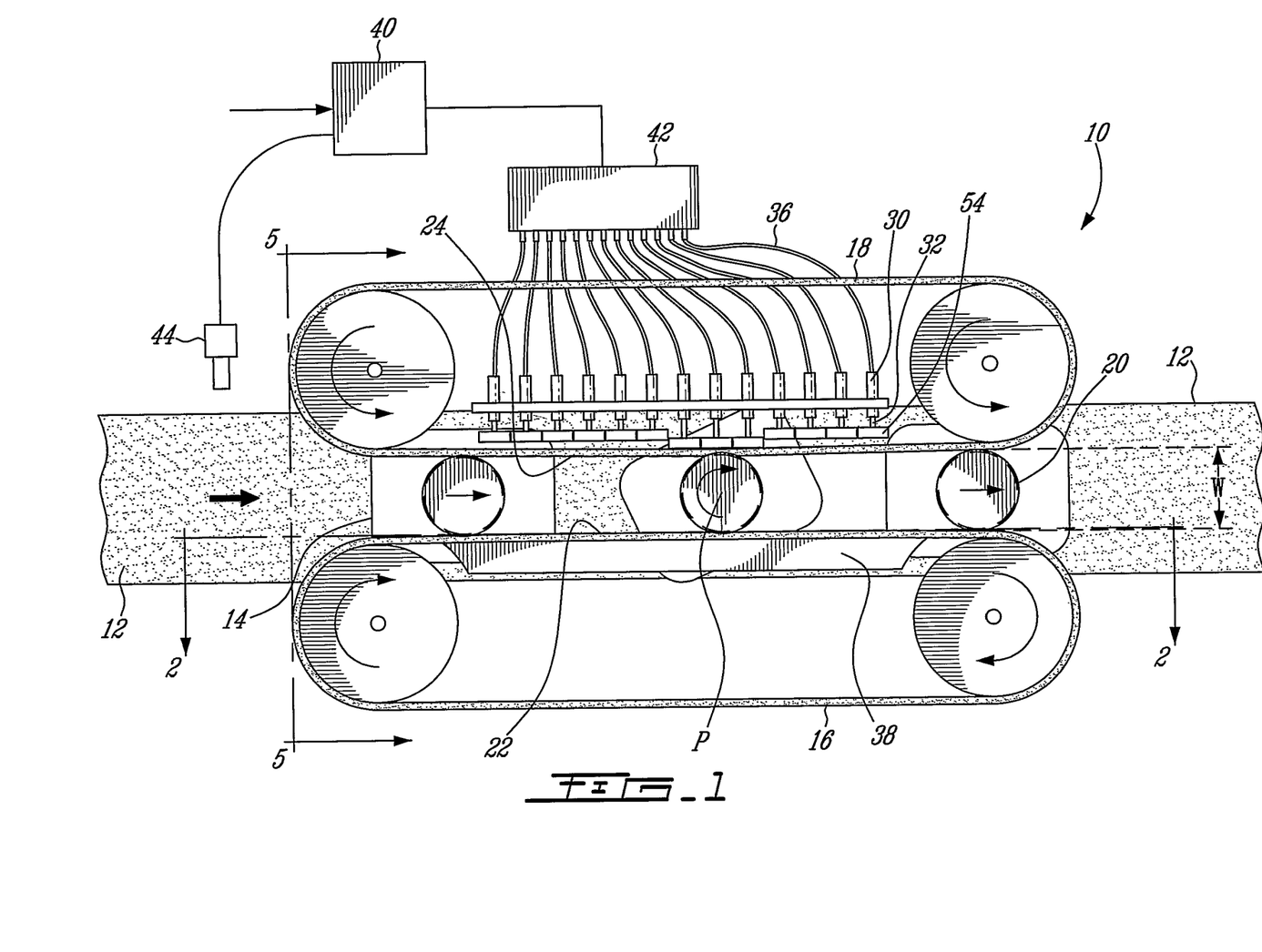
FIG. 1 is a top view of a package alignment system for a conveyor in accordance with an illustrative embodiment of the present invention.

Referring to FIG. 1, the package alignment system, generally referred to using the reference numeral 10, is comprised of a conveyor belt 12 on which are transported the articles as in 14 to be rotated. The conveyor belt 12 conveys the articles 14 into a gap between a first moving belt 16 and a second moving belt 18, the belts typically being manufactured from a robust pliable material such as rubber, urethane or neoprene reinforced with fibreglass, Kevlar®, or the like. In the region of the gap, the first moving belt 16 and the second moving belt 18 follow parallel paths that are at substantially the same height above and parallel to the conveyor belt 12, such that items, while being conveyed through the gap, travel between and in the same direction as the moving belts 16 and 18.

Figure 2:
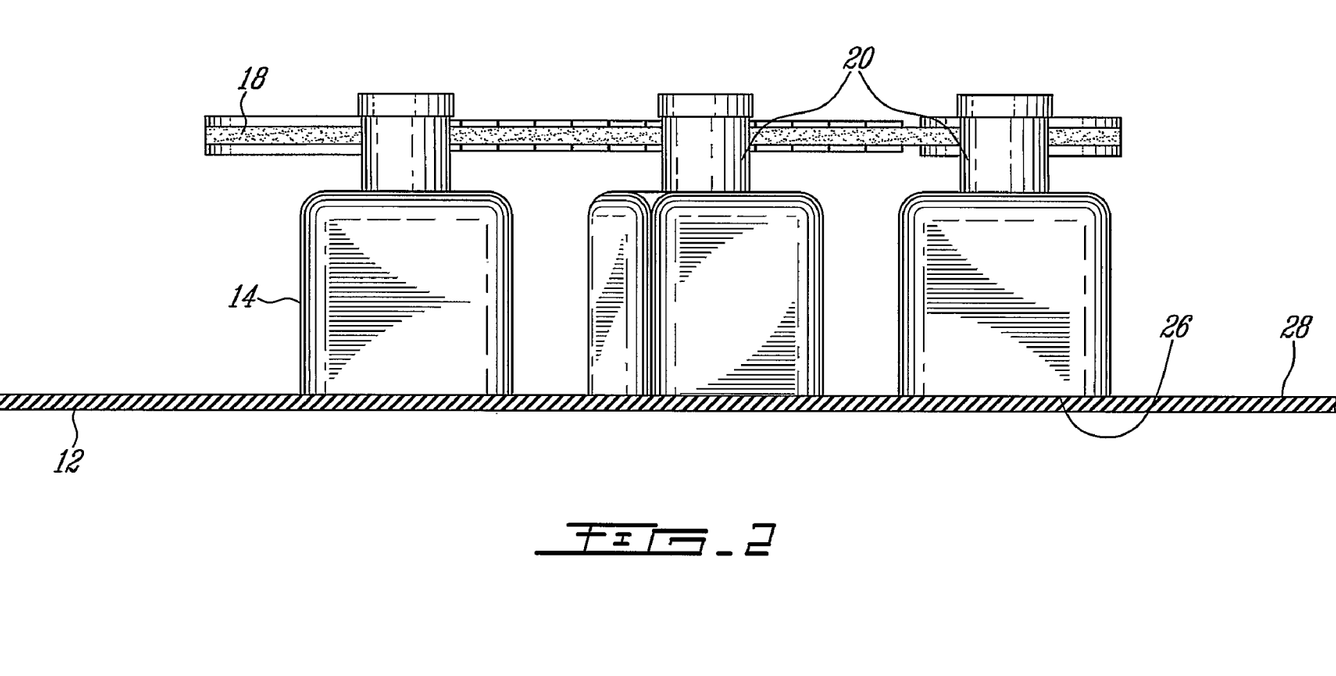
FIG. 2 is a side view along 2-2 of the package alignment system for a conveyor disclosed in FIG. 1.

The articles as in 14 being conveyed on the conveyor belt 12 can be of a variety of shapes, however in the disclosed embodiment the articles are of similar shapes and include a neck portion 20 having a substantially cylindrical shape. Referring to FIG. 2, the package alignment system 10 is adjusted such that the first moving belt 16 and the second moving belt 18 are level with the neck portion 20.

Referring back to FIG. 1 in addition to FIG. 2, the first moving belt 16 and the second moving belt 18 travel at different speeds, typically with one of the moving belts (in the case at hand the second moving belt 18) travelling faster than the conveyor belt 12 and the other moving belt (in the case at hand the first moving belt 16) travelling slower than the conveyor belt 12. Therefore, if the neck portion 20 of an article as in 14 is pressed between the first moving belt 16 and the second moving belt 18, a rotating force will be brought to bear on the neck portion 20 thereby causing the article to rotate around a point P which moves with the conveyor belt 12. However, in order to cause an article as in 14 to rotate in this manner, it is necessary that the force which is brought to bear on the neck portion 20 by the surfaces 22, 24 of the first moving belt 16 and a surface 24 of the second moving belt 18 be sufficient to overcome both the friction between the lower surface 26 of the article 14 and the conveying surface 28 of the conveyor belt 12 as well as the inertia of the article 14. In this regard, and referring back to FIG. 1, the distance W between the opposing surfaces of the first moving belt 16 and the second moving belt 18 is initially adjusted to form a gap that is as narrow as possible while allowing containers to progress through it without coming in contact with either of said belts when all pressure pads 30 are retracted.

In other words, in order to turn an article as in 14, a force is applied behind at least one of the moving belts 16 and 18 in the region where the article to be rotated is located. The force should be sufficient such that the first surface 22 presses the article 14 against the other surface 24 while producing sufficient friction between the article 14 and the two surfaces 22, 24 to overcome the friction between the article and the conveying surface 12 and induce rotation about a point P. Furthermore, by applying such pressure over only a certain proportion of the length of the gap between belts 16 and 18, a selected article as in 14 in a stream of articles travelling along the conveying surface 28 of the conveyor belt 12 may be rotated while other articles in the stream are selectively not rotated. Additionally, a proportional varying angle of rotation may also be obtained for a given article by selectively applying the rotational force over a limited period of time. In order to carry out these functions, the package alignment system 10 is equipped with a series of pistons as in 30.

Figure 3:
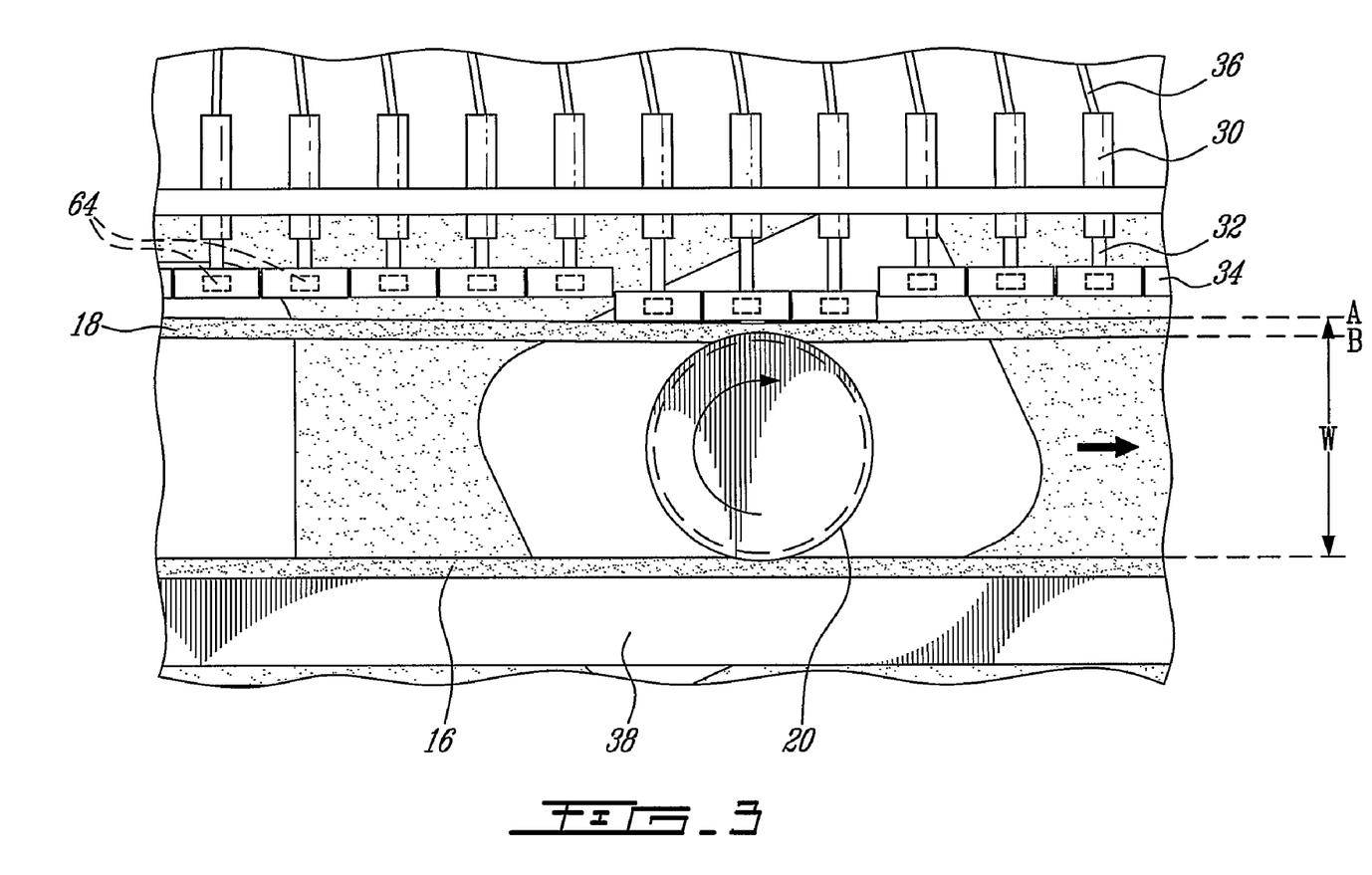
FIG. 3 is a detailed top view of the package alignment system for a conveyor disclosed in FIG. 1.

Referring to FIG. 3, each piston 30 is attached via a piston rod 32 to a pressure pad 34, the pressure pad 34 manufactured from a rigid material such as UHMW polyethylene, nylon or the like. The piston rod 32 may be extended to move the pressure pad 34 to its extended pressure applying position by applying compressed air to the piston 30 via an air hose 36. As will now be understood by a person of ordinary skill in the art, by extending the pressure pad 34 via the piston rod 32, the distance W between the first moving belt 16 and the second moving belt 18 can be reduced in the region of the pressure pad 34 such that pressure is brought to bear on the neck portion 20 of an article 14, thereby causing the neck portion 20 to rotate. In this regard, lateral movement of the second moving belt 18 away from the first moving belt 16 can be limited by the provision of a retaining surface 38. Alternatively, the retaining surface 38 could be replaced by a series of pistons, piston rods and pressure pads (all not shown) for moving the first moving belt 16 towards the second moving belt 18.

Note that although the present illustrative embodiment makes reference to pistons driven by compressed air, other actuators, for example those driven by hydraulic fluid or solenoids, could also be used in a given implementation.

When the supply of compressed air to the piston 30 is reversed (or shut off if the piston 30 is biased using a spring or the like to return the piston rod 32 to the retracted position), the piston rod 32 retracts and the pressure pad 34 returns to the non-extended position, thereby relieving the pressure exerted on the article as in 14 by the first moving belt 16 and the second moving belt 18 in the region of the pressure pad 34.

Referring back to FIG. 1, a micro-controller 40 is used to control the valves 42 which supply compressed air to the pistons 30 via their respective air hoses as in 36. Inputs to the micro-controller 40 include:

The speed of the conveyor belt 12;
a discrete signal from a sensor 44 located at a known distance upstream of the alignment system 10 detecting the presence at that location of articles on conveyor belt 12;
pulses generated by a device known as an encoder (not shown), each pulse corresponding to a known displacement of the conveyor belt 12.
A signal or a combination of signals from one or several second sensors (not shown) located close to sensor 44 that can be interpreted to by the micro-controller 40 to determine the orientation of an article at the moment it is detected by sensor 44.

Illustratively, the micro-controller 40 would process these inputs as follows:

The required speeds for belts 16 and 18 are calculated as that of belt 12 plus a certain percentage for the faster one of belts 16 and 18, and minus the same percentage for the slower one. Adding and subtracting the same percentage ensures that products that rotate do so while moving at the same speed as belt 12;
for each pulse that is generated by the encoder, a value of 0 or 1 is memorized by the micro-controller. A value of 1 is memorized if the detection by sensor 44 and the second sensor(s) (not shown) of an article to be rotated coincides with the reception of a pulse from the encoder, otherwise a value of 0 is memorized. The N most recent such values are kept in the micro-controller's memory in the order in which they are generated, forming a string of zeroes and ones known as a shift register. This shift register is an exact representation of the positions of the articles to be rotated on a section of conveyor 12 whose length is N times the distance that is known to correspond to an encoder pulse, and which starts where sensor 44 is located;

the length N covered by the shift register must be at least sufficient to track the position of the articles until they exit the gap between belts 16 and 18;

the distance corresponding to consecutive pulses being known as well as the position of sensor 44, it is easy to associate each pressure pad 34 with one or more consecutive positions in the shift register. A value of 1 at any one of these positions signals the presence of a product that needs to be rotated in front of the corresponding pressure pad; and for each pressure pad 34, the micro-controller continuously monitors the values at the positions associated with it in the shift register and, if it is wished to rotate that article, sends a signal to the corresponding valve 42 whenever a value of 1 is present at that position.

Additionally, with provision of an appropriate sensor or sensors, such as optic or ultrasonic detectors, video cameras and the like, the orientation of the article to be rotated can also be determined and provided to the micro-controller 40. This would allow, for example, the micro-controller 40 to control rotation such that certain articles would be rotated more than others, while other articles would not be rotated at all.

It follows from the above that articles that need to be rotated progress through the gap between the belts 16 and 18 in a narrow pressure zone that accompanies them. This pressure zone is created by the successive activation of pressure pads 34 by the micro-controller 40 (via corresponding valves 42 and tubes 36) synchronous with the progress of the articles as in 14 through the gap. The ability to apply pressure only where it is needed allows the alignment system 10 to simultaneously handle articles that need to be rotated and others that do not.

When two articles are rotated simultaneously, the moving belts 16, 18 come in contact with both rotating articles as the belts are pressed against the articles by the pressure pads 34. Between these articles, the moving belts 16, 18 follow parallel paths, forming a gap whose width is equal to or slightly less than the diameter of an article. If an article that must not be rotated is located between two rotating articles, the moving belts 16, 18 will necessarily come in contact with this article. In order to prevent rotation of this article, the surface of the moving belts 16, 18 that is in contact with the articles must be made of a material that will not produce enough friction to induce rotation of an article when the belts contact this article without being pressed against it by one of the pressure pads 34. Alternatively, the surfaces of the moving belts 16, 18 can be treated with a friction reducing substance or lubricant resulting in a reduction in a coefficient of friction of the surfaces thereby achieving the same effect.

Still referring to FIG. 1, as stated above, in order to rotate an article located in the gap between the moving belts 16, 18, the pressure exerted on the neck portion of the article must be sufficient to overcome friction and inertia. In some cases, for example when the articles to be rotated are empty and manufactured from a light material such as PET, the pressure required to overcome the frictional and inertial forces and rotate the article is minimal. In such cases, even light pressure exerted on the neck portion 20 of an article 14 can cause the article to rotate. In some cases, given the relatively narrow gap between the moving belts 16, 18, the neck portion 20 of an article 14 may inadvertently strike one or other of the moving belts 16, 18. In some cases this may lead to the article being inadvertently rotated or cause the article to fall over, fouling the conveyor belt 12 and requiring action on behalf of an operator to clear the foul.

Figure 4:
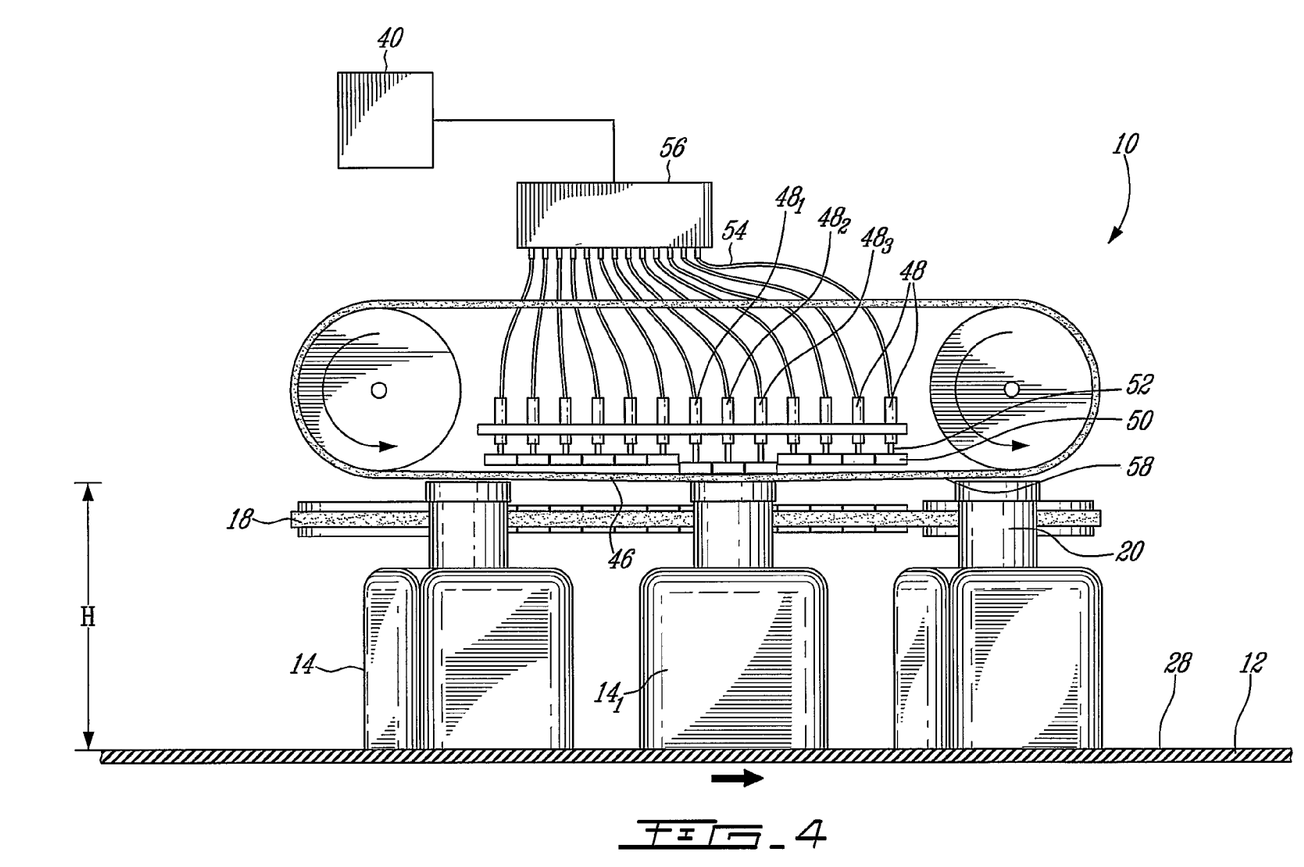
FIG. 4 is a side view of a package alignment system for a conveyor in accordance with an alternative illustrative embodiment of the present invention.

Referring now to FIG. 4, an alternative illustrative embodiment of a package alignment system 10 in accordance with present invention will be described. In order to stabilise articles as in 14 moving along the conveying surface 28 and ensure that light articles are not inadvertently rotated or knocked over, a (third) moving belt 46 and a (second) series of pneumatic pistons as in 48 for applying a vertical pressure to the articles as in 14 is provided. Each piston as in 48 is attached to a pressure pad 50 via a piston 52. The pistons as in 48 are attached to a controlled source of compressed air via a series of hoses 54. The micro-controller 40 controls a series of valves 56 which, when activated, actuate the pistons causing the piston rods 52, and thus the pressure pads 46, to move from their retracted to extended positions. On deactivation of the valve(s) 56, the piston rods 52, and thus the pressure pads 50, will return to their retracted positions.

Still referring to FIG. 4, the third moving belt 46 is oriented such that its outer surface 58 is opposite the conveying surface 24 of the conveyor belt 12 at least within the gap between the first moving belt 16 and the second moving belt 18. The speed of the third moving belt 46 is also adjusted such that the outer surface 58 travels at the same speed as the conveyor belt 12. Provided the distance H between the outer surface 58 of the conveying surface 24 is correctly adjusted, actuation of a particular piston as in $48_1$, $48_2$, and $48_3$ when an article as in $14_1$ is located directly below the piston as in $48_1$, $48_2$, and $48_3$ will cause the outer surface 58 of the third moving belt 46 to deflect towards the conveying surface 12. This has the effect of reducing the opening defined by the outer surface 58 of the third moving belt 46 and the conveying surface 12 such that it is less than the dimensions of the article 14 along the article axis. This in turn causes the outer surface 58 of the third moving belt 46 and conveying surface 12 to exert a pressure on the article $14_1$, thereby preventing the article $14_1$ from being inadvertently rotated or from falling over. By controlling the actuation of successive pistons as in 48 to correspond with the speed of the article 14, the exertion of vertical pressure on a particular article as in 14 can be made to follow the article 14 as it moves with the conveyor belt 12.

Figure 5:
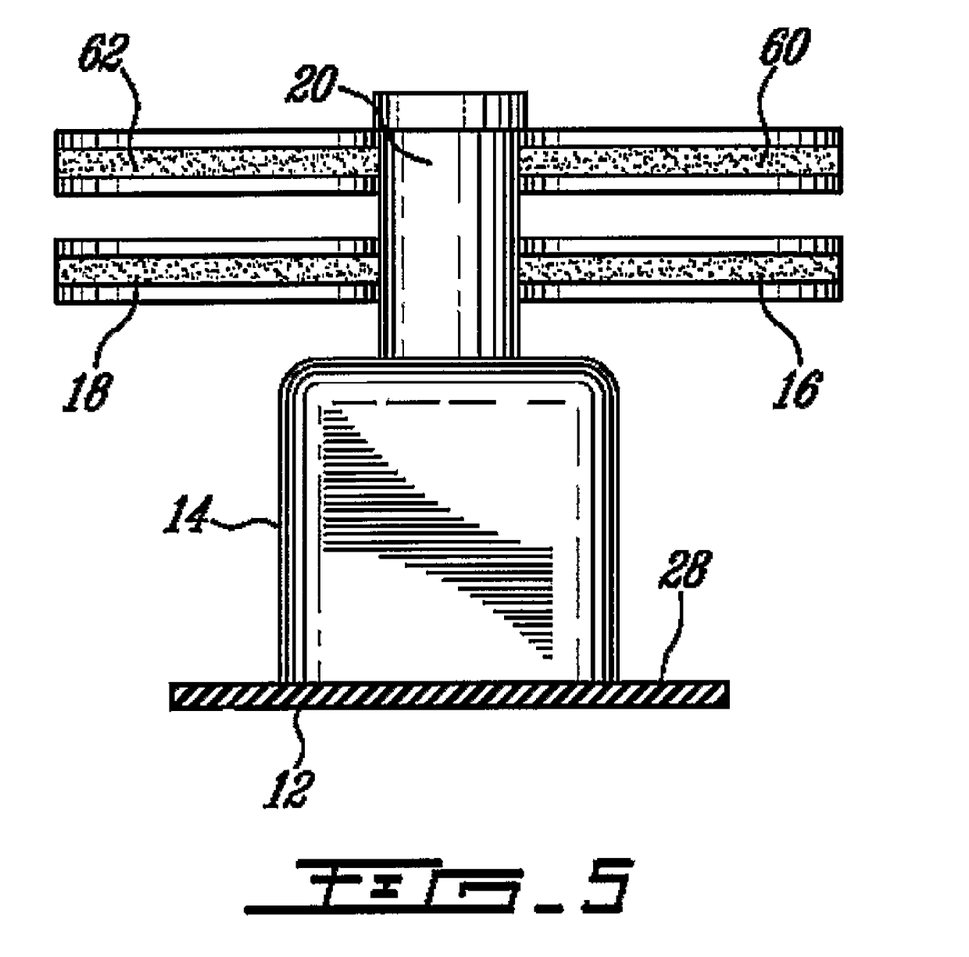
FIG. 5 is an end view along 5-5 of the package alignment system for a conveyor disclosed in FIG. 1 in accordance with a second alternative illustrative embodiment of the present invention.

Referring now to FIG. 5, in a second alternative illustrative embodiment of the present invention, in order to stabilise articles as in 14, and provided the neck portion 20 of the articles is of sufficient length, a second pair of moving belts as in 60, 62 is positioned above the first moving belt 16 and the second moving belt 18 (although it will be understood by a person of skill in the art that second pair of moving belts as in 60, 62 could also be positioned below the first and second moving belts 16, 18). These belt are typically manufactured from a robust pliable material such as rubber, urethane or neoprene reinforced with fibreglass, Kevlar®, or the like. In the region of the gap between the belts, the second pair of moving belts 60, 62 both follow parallel paths that are at substantially the same height above and parallel to the conveyor belt 12, such that items, while being conveyed through the gap, travel between and in the same direction as the second pair of moving belts. Additionally, the second pair of moving belts both travel at substantially the same speed as the conveying surface 28 of the conveyor belt 12. The gap between the second pair of moving belts 60, 62 is adjusted such that an amount of force is exerted on the neck portion 20 of all the articles as in 14 travelling through the gap. The amount of force exerted by the second pair of moving belts 60, 62, and the corresponding frictional force exerted by the surfaces of the second pair of moving belts 60, 62 that must be overcome to rotate the article, is sufficient to stabilise the articles as in 14, but less than the force exerted on the neck portion 20 by the first moving belt 16 and the second moving belt 18 in order to rotate the article.

Referring back to FIG. 1, in a third alternative illustrative embodiment, in order to stabilise the articles as in 14 travelling along the conveying surface 28 of the conveyor belt 12, a series of holes (not shown) are provided in the conveyor belt 12 and a source of suction applied to the holes as the conveyor belt 12 passes underneath the gap between the moving belts 16, 18. It will now be apparent to a person of skill in the art that by aspirating air through the conveyor belt 12, a suction force is applied to the lower surface (reference 26 in FIG. 2) of each article as in 14 thereby increasing the force of adhesion between the lower surface each article as in 14 and the conveying surface 28. Such a sectional force is straight forward to generate, for example by using a source of compressed air and the well known Venturi effect. The suction force is adjusted such that the force of adhesion between the lower surface each article as in 14 and the conveying surface 28 is sufficient to stabilise the article, but less but less than the force exerted on the neck portion 20 by the first moving belt 16 and the second moving belt 18 in order to rotate the article.

Referring back to FIG. 3, in a fourth alternative illustrative embodiment, in order to reduce contact between the second moving belt 18 and articles 14 where turning is not desired, a magnet as in 64 is introduced into each of the pressure pads as in 34. Additionally, the second moving belt 18 is manufactured to include a ferrous material such as steel, for example a steel mesh or wire. Persons of ordinary skill in the art will appreciate that the second moving belt 18 will be attracted towards the magnets as in 64, and therefore the pressure pads as in 34. As a result, when the pressure pads as in 34 are retracted, the second moving belt 18 will follow to some degree the pressure pads as in 34, thereby reducing any potential pressure which may otherwise be applied to the neck 20 of an article 14 located adjacent that particular pressure pad 34.

It is to be understood that the invention is not limited in its application to the details of construction and parts illustrated in the accompanying drawings and described hereinabove. The invention is capable of other embodiments and of being practised in various ways. It is also to be understood that the phraseology or terminology used herein is for the purpose of description and not limitation. Hence, although the present invention has been described hereinabove by way of preferred embodiments thereof, it can be modified, without departing from the spirit, scope and nature of the subject invention as defined in the appended claims.

What is claimed is:

1. An assembly for rotating a selected article in a stream of like articles without rotating an adjacent article, each of the articles moving along a conveying surface of a conveyor belt with a speed of forward travel and comprising an axis which is normal to the conveying surface, the assembly comprising:
    a mechanism for revolving the selected article around the axis without changing the speed of forward travel of the axis;
    wherein a distance traveled by the axis of the revolving selected article is greater than a distance between the axis of the revolving selected article and the axis of the non-revolving adjacent article,
    wherein each of the articles comprises a substantially cylindrical portion coaxial with the article axis of rotation, and said revolving mechanism comprises:
    first and second moving surfaces, said surfaces positioned opposite one another at a level of the article cylindrical portion, said surfaces running parallel to and travelling in the same direction as the conveying surface, each of said surfaces travelling at a speed different than the speed of forward travel such that the average of said first and second moving surface speeds is the speed of forward travel; and
    a mechanism for increasing friction between said moving surfaces and said selected article cylindrical portion.

2. The assembly as in claim 1, wherein said first and second moving surfaces are ordinarily separated by a gap equal to or greater than a diameter of the article cylindrical portion, and wherein said friction increasing mechanism comprises:
    a sensor for determining the position of the axis of the selected article between said first and second moving surfaces; and
    an actuating assembly for reducing said gap at a point opposite the selected article axis such that said gap is less than a diameter of the article cylindrical portion.

3. The assembly as in claim 2, wherein said actuating assembly is comprised of a row of pressure pads and said first moving surface is provided by a first moving belt positioned between said row and the stream of articles, each of said pads moveable towards said belt, wherein when moved towards said belt, a given one of said pressure pads deflects said first moving surface towards said second moving surface, thereby reducing said gap.

4. The assembly as in claim 3, wherein said first moving belt is manufactured from a magnetic material and each of said pressure pads is comprised of a magnet.

5. The assembly as in claim 3, wherein said pressure pads are manufactured from UHMW polyethylene.

6. The assembly as in claim 3, wherein said moving belts are manufactured from a material selected from the group consisting of rubber, urethane, neoprene, fibreglass and Kevlar® or combinations thereof.

7. The assembly as in claim 3, wherein said actuating assembly further comprises a plurality of pistons, one of each of said pistons for moving each of said pressure pads.

8. The assembly as in claim 7, wherein said pistons are pneumatic pistons.

9. The assembly as in claim 7, further comprising a controller for providing compressed air to said pistons.

10. An for rotating a selected article in a stream of like articles without rotating an adjacent article, each of the articles moving along a conveying surface of a conveyor belt with a speed of forward travel and comprising an axis which is normal to the conveying surface, the assembly comprising:
    a mechanism for revolving the selected article around the axis without changing the speed of forward travel of the axis;
    wherein a distance traveled by the axis of the revolving selected article is greater than a distance between the axis of the revolving selected article and the axis of the non-revolving adjacent article,
    wherein each of the articles comprises a substantially cylindrical portion coaxial with the article axis and said revolving mechanism comprises:
    first and second moving surfaces applying a rotational force to said cylindrical portion, said surfaces positioned opposite one another at a level of the article cylindrical portion, said surfaces running parallel to and travelling in the same direction as the conveying surface, each of said surfaces travelling at a speed different than the speed of forward travel such that the average of said first and second moving surface speeds is the speed of forward travel; and
    a mechanism for applying a pressure to the adjacent article in a direction substantially parallel to the article axis thereby preventing said adjacent article from being rotated by said rotational force.

11. The assembly as in claim 10, wherein said pressure applying mechanism comprises:
a moving surface positioned opposite the conveying surface and moving at a speed of the conveying surface, the articles travelling in an opening between said moving surface and the conveying surface;
a sensor for determining the position of the adjacent article along the conveying surface; and
an actuating assembly for reducing said opening at a point opposite the selected article such that said opening is less than a dimension of the adjacent article along the article axis.

12. The assembly as in claim 11, wherein said actuating assembly comprises a row of pressure pads and said moving surface of said pressure applying mechanism is provided by a belt travelling between said row and the stream of articles, each of said pads moveable towards said moving surface of said pressure applying mechanism, wherein when moved towards said moving surface of said pressure applying mechanism, a given one of said pressure pads deflects said moving surface of said pressure applying mechanism towards said conveying surface, thereby reducing said opening.

13. An assembly for selectively rotating an article around an article axis, the article moving along a conveying surface of a conveyor belt with a speed of forward travel and comprising a substantially cylindrical portion coaxial with the article axis, the assembly comprising:
first and second moving surfaces, said surfaces positioned opposite one another at a level of the article cylindrical portion, said surfaces running parallel to and travelling in the same direction as the conveying surface, each of said surfaces travelling at a speed different than the speed of forward travel such that the average of said first and second moving surface speeds is the speed of forward travel; and
a mechanism for increasing friction between said moving surfaces and said selected article cylindrical portion,
wherein said first and second moving surfaces are ordinarily separated by a gap equal to or greater than a diameter of the article cylindrical portion, and wherein said friction increasing mechanism comprises:
a sensor for determining the position of the axis of the selected article between said first and second moving surfaces; and
an actuating assembly for reducing said gap at a point opposite the selected article axis such that said gap is less than a diameter of the article cylindrical portion.

14. The assembly as in claim 13, wherein said actuating assembly is comprised of a row of pressure pads and said first moving surface is provided by a first moving belt positioned between said row and the stream of articles, each of said pads moveable towards said belt, wherein when moved towards said belt, a given one of said pressure pads deflects said first moving surface towards said second moving surface, thereby reducing said gap.

15. The assembly as in claim 13, further comprising a means for stabilising the article.

16. The assembly as in claim 15, wherein said stabilising means comprises a series of holes in the conveying surface and a source of suction drawing air through said holes from the conveying surface.

17. The assembly as in claim 16, wherein said source of suction comprises a source of compressed air and a venturi effect device.

18. The assembly as in claim 15, wherein said stabilising means comprises a second pair of moving surfaces, said surfaces positioned opposite one another at a level of the article cylindrical portion, said surfaces running parallel to and travelling in the same direction as the conveying surface, each of said surfaces travelling at substantially the same speed as the speed of forward.

19. The assembly as in claim 18, wherein said second pair of moving surfaces are positioned above said first and second moving surfaces.

20. The assembly as in claim 18, wherein said second pair of moving surfaces are positioned below said first and second moving surfaces.

21. The assembly as in claim 18, wherein each of said second pair of moving surfaces is provided by a moving belt.

22. An assembly for selectively applying pressure to a selected article in a stream of like articles, each of the articles moving along a conveying surface of a conveyor belt with a speed of forward travel and comprising an axis which is normal to the conveying surface, the assembly comprising:
a moving surface positioned opposite the conveying surface and moving at a speed of the conveying surface, the articles travelling in an opening between said moving surface and the conveying surface;
a sensor for determining the position of the selected article along the conveying surface; and
an actuating assembly for reducing said opening at a point opposite the selected article such that said opening is less than a height of the selected article,
wherein said actuating assembly comprises a row of pressure pads and said moving surface is provided by a moving belt travelling between said row and the stream of articles, each of said pads moveable in a direction towards said moving surface, wherein when moved towards said moving surface, a given one of said pressure pads deflects said moving surface towards said conveying surface, thereby reducing said opening.

* * * * *